United States Patent [19]

Boillot et al.

[11] Patent Number: 4,532,404

[45] Date of Patent: Jul. 30, 1985

[54] REAL TIME CONTROL SYSTEM AND PROCESS FOR CONTROLLING PREDETERMINED OPERATING CHARACTERISTICS OF A WELDING MECHANISM

[75] Inventors: Jean-Paul Boillot, Beloeil; Ghislain Bégin, Boucherville; N. Alexandrov, St. Bruno; Jean-Luc Fihey, Ste-Julie; A. Di Vincenzo, Anjou; Denis Villemure, St. Bruno, all of Canada

[73] Assignee: Canadian Patents and Development Limited, Ottawa, Canada

[21] Appl. No.: 462,713

[22] Filed: Feb. 1, 1983

[51] Int. Cl.$^3$ ................................ B23K 9/10
[52] U.S. Cl. .................. 219/124.34; 219/130.21
[58] Field of Search ............. 219/124.34, 123, 130.21

[56] References Cited

U.S. PATENT DOCUMENTS

| | | | |
|---|---|---|---|
| 2,994,763 | 8/1961 | Schultz | 219/123 |
| 3,370,151 | 2/1968 | Normando | 219/124.34 |
| 3,855,446 | 12/1974 | Kotova et al. | 219/124.34 |
| 4,399,346 | 8/1983 | Kearney | 219/124.34 |
| 4,477,712 | 10/1984 | Lillquist et al. | 219/124.34 |

FOREIGN PATENT DOCUMENTS

| | | | |
|---|---|---|---|
| 2608720 | 9/1977 | Fed. Rep. of Germany | 219/124.34 |
| 2749117 | 5/1979 | Fed. Rep. of Germany | 219/124.34 |
| 490595 | 2/1976 | U.S.S.R. | 219/124.34 |
| 548392 | 4/1977 | U.S.S.R. | 219/124.34 |
| 568515 | 12/1977 | U.S.S.R. | 219/124.34 |

Primary Examiner—Clifford C. Shaw
Attorney, Agent, or Firm—Oblon, Fisher, Spivak, McClelland & Maier

[57] ABSTRACT

A real time control system and process for controlling predetermined operating characteristics of a welding mechanism movable along a workpiece joint to be welded, the workpiece joint having two opposed edges. A thermal radiation sensing device is responsive to thermal radiation energy emanating from a heated workpiece joint. The sensing device is positioned along a travelling path of a welding element of the welding mechanism, ahead of and in close proximity to the welding element, the sensing device and welding element being disposed on a common side relative to the workpiece joint. The thermal radiation sensing device is caused to scan the workpiece joint along a line transverse to the travelling path so as to allow the sensing device to sense a thermal radiation profile along the transverse scanning line and to provide peak signals representative of the relative position of the edges of the workpiece joint in accordance with the thermal radiation profile sensed, thereby defining the actual width of the joint. Circuitry is provided for processing the peak signals provided by the radiation sensing device to issue command signals for controlling the predetermined operating characteristics of the welding mechanism.

34 Claims, 16 Drawing Figures

REAL TIME CONTROL SYSTEM AND PROCESS FOR CONTROLLING PREDETERMINED OPERATING CHARACTERISTICS OF A WELDING MECHANISM

BACKGROUND OF INVENTION (a) Field of the Invention

The present invention relates to an improved process and system for controlling welding operations and more particularly to a system and a process which controls the quality of a weld in relation to the actual shape of a joint to be welded between two metal pieces of a workpiece to be welded by detecting the thermal radiation energy emanating from the joint in close proximity to a welding element.

(b) Description of Prior Art

In accordance with a general feature, the present invention provides an accurate control of some operating conditions of the electrode of an arc welding machine, such as the electrode current position or the travelling speed of same by adapting such operating conditions to the particular configuration or geometry of the workpiece joint to be welded so as to form thereover an homogeneous and regular weld seam of a required quality. Such an adequate quality seam is of course obtained whenever the joint is properly tracked by the arc electrode and filled by the weld material during the welding operation, which implies more than just a center-line following or tracking of the workpiece joint. Heretofore, several mechanical devices have been attached to the electrode holder to track and position the electrode along a joint. However, these types of devices, although dependable where the joint presents a linearly extending constant width configuration, are still wholly ineffective when the workpiece joint is of irregular width or follows a rather awkward path, thereby producing a weld seam of poor or inacceptable quality.

With the advance of technology, more sophisticated systems were proposed to control the quality of the weld seam with most of those systems advocating the use of infrared radiation sensitive devices that collect the infrared rays emitted from a workpiece heated to a high temperature by a flame or an electric power arc, in the vicinity of the welding zone. For example, U.S. Pat. No. 2,089,015 discloses a system wherein a photo-electric cell is focused on the highly heated or fused metal adjacent or at the welding point in order to detect instantly changes in the welding zone above or below a predetermined normal condition so as to control the operation of the welding machine to ensure the welding of the gap between the plate edges by the welding material. However, the latter system does not provide any quality insurance as to the correctness and accuteness of the weld seam resulting from the welding operation.

U.S. Pat. No. 3,370,151 does provide a system effective in determining the correctness and regularity in width of the weld seam by detecting the sharp changes in temperature occurring at both edges of the seam by transverse scanning the seam with a photocell head. Such a system, however, has drawbacks in that where defects are detected, the welding operation has to be resumed again. Both above-mentioned prior art systems are totally ineffective in controlling accurately, by any means, the quality of a weld whenever a major irregularity occurs along the profile of a workpiece joint to be welded and further when the temperature dissipation in the vicinity of the welding zone is altered or impaired by the presence of elements such as heat sinks, grooves, or bores which considerably affect the dissipation rate of the heat generated by the arc electrode through the workpiece.

SUMMARY OF INVENTION

It is a general feature of the present invention to provide a system and a process for controlling effectively and in real time welding operations performed over a workpiece presenting on irregular joint profile whereby a joint is welded in conformity with the actual width of the joint.

Another feature of the present invention is to provide a process and a system for controlling efficiently welding operations and the quality of the resulting weld seam regardless of the presence of sources or elements, on the plates to be welded, which disturb the heat dissipation rate through the heated workpiece.

The above and other features of the present invention are achieved by the provision of a system and a process particularly adapted to sense and determine the amount of infrared rays emitted, immediately ahead of a welding element, by the edges of a workpiece joint to be welded by scanning along a line extending across the joint, which is longitudinally displaced, by means of an infrared radiation energy sensitive device so as to detect in real time the actual temperature profile along the transverse line in order to control the operation characteristics of the welding element of the welding machine.

In accordance with the present invention, there is thus provided a real time control system for controlling predetermined operating characteristics of a welding mechanism movable along a workpiece joint to be welded, the workpiece joint having opposed edges. The system comprises thermal radiation sensing means responsive to thermal radiation energy emanating from a heated workpiece joint, the sensing means being prositioned along a travelling path of a welding element of the welding mechanism, ahead of and in close proximity to the welding element, the sensing means and welding element being disposed on a common side relative to the workpiece joint. The system also includes means for causing the thermal radiation sensing means to scan the workpiece joint along a line transverse to the travelling path so as to allow the sensing means to sense a thermal radiation profile along the transverse scanning line and to provide peak signals representative of the relative position of the edges of the workpiece joint in accordance with the thermal radiation profile sensed, thereby defining the actual width of the joint. Circuitry means is further provided for processing the peak signals provided by the radiation sensing means to issue command signals for controlling the predetermined operating characteristics of the welding mechanism.

The present invention also provides, in a further aspect thereof, a process for controlling in real time predetermined operating characteristics of a welding mechanism movable along a workpiece joint to be welded, the workpiece joint having opposed edges. The process comprises positioning a thermal radiation sensing means along a travelling path of a welding element of the welding mechanism, ahead of and in close proximity to the welding element, the thermal radiation sensing means being responsive to thermal radiation energy emanating from a heated workpiece joint. Both the sensing means and welding element are disposed on a common side relative to the workpiece joint. The thermal radiation sensing means is caused to scan the workpiece joint along a line transverse to the travelling path so as to sense a thermal radiation profile along the transverse scanning line and to provide peak signals representative of the relative position of the edges of the workpiece joint in accordance with the thermal radiation profile sensed, thereby defining the actual width of the joint. The peak signals are then processed through circuitry means to issue command signals for controlling the predetermined operating characteristics of the welding mechanism.

In a preferred embodiment of the present invention, the thermal radiation energy sensing means includes a pyrometer responsive to temperature variations defined along the temperature profile of the scanning line whereas the detected signals are used to control the travelling speed of the welding mechanism of the workpiece or the feed rate of the weld rod or wires.

A further embodiment of the present invention consists in providing a collimator made up of a bundle of optic fibers operatively connected to photo-electric cells to detect the amount of thermal energy emitted from the heated workpiece. The collimator is properly shielded against stray radiation and adequately cooled.

BRIEF DESCRIPTION OF DRAWINGS

A preferred embodiment of the present invention will be hereinafter described with reference to the examples thereof illustrated by the accompanying drawings, in which.

As mentioned previously, the operating principle on which the present invention is based mainly resides in detecting a temperature profile taken along a scanning line transverse to the longitudinal axis of the joint or gap of a workpiece made up of two metal pieces, such detection being effected ahead a welding element. The temperature profile is sensed by means of an infrared radiation energy sensitive device which is scanned along the transverse axis of the joint in order to define accurately the width of the workpiece joint by locating the exact position of both edges along these scanning lines. The instant detecting method is of course applicable in the case where the joint is linear and its width is constant, but the method is thoroughly effective in the two particular cases shown in FIGS. 1 and 2 wherein conventional control and detecting systems fail to provide for a high quality weld seam.

DESCRIPTION OF PREFERRED EMBODIMENTS

Figure 1:
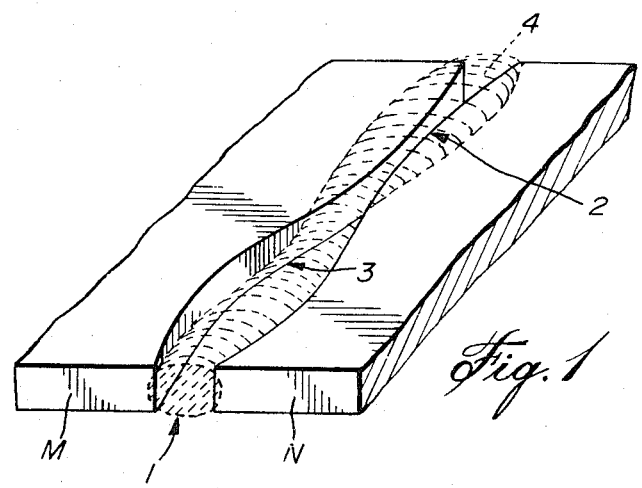
FIG. 1 is a perspective view showing an irregular joint profile that might be encountered in a welding operation.

In FIG. 1, the workpiece is made up of two metal plates M and N jointed end-to-end, each of them presenting an edge profile which is quasi-sinusoidal thereby defining a gap 1 having an irregular configuration and shape of varying width. In this case, the width of the joint is narrowing in the area designated at 2 whereas it is widening at the area designated at 3 so that the use of a conventional control process will result in an inacceptable weld seam, as shown by in phantom lines 4.

Figure 2:
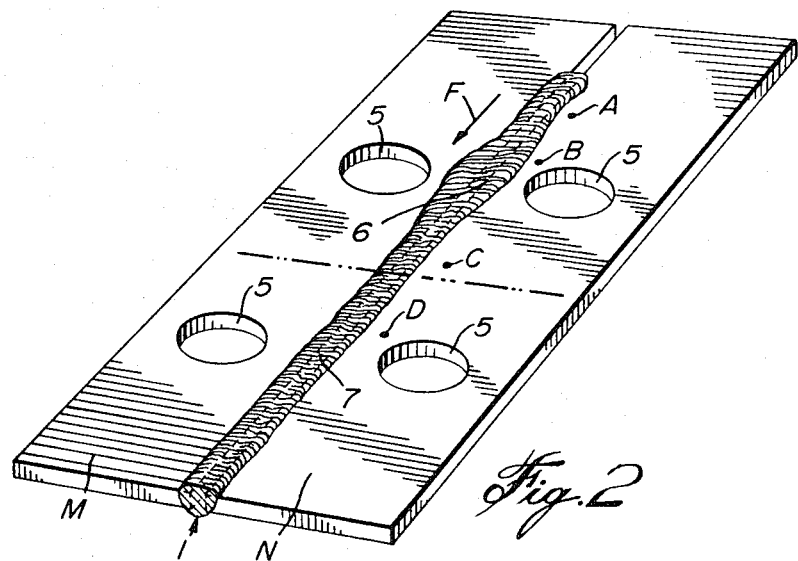
FIG. 2 is a perspective view showing thermal energy distributing sources along a workpiece joint and affecting the dissipation rate of heat generated from the welding element.

In FIG. 2, the joint is of a constant width but each plate M and N comprises inhibiting elements such as the bores 5 which prevent the heat generated by the welding electrode to be evenly dissipated through the welded plates. In that Figure, the resulting weld seam produced by a conventional method and the method of the present invention are compared. Thus, the seam at 6 has been produced by a welding system not adequately controlled whereas seam at 7 is effectively controlled in real time to adjust the speed of the welding electrode in accordance with the variation or changes in the heat dissipation capacity of the workpiece in the vicinity of the holes 5. When the welding electrode reaches points A or C, the heat dissipation rate across the workpiece is normal and the resulting weld seam offers a regular configuration or profile. However, in the vicinity of points B and D dissipation is considerably inhibited by holes 5 and thus, if the heat input is not modified accordingly, overheating of the weld material occurs, the temperature at the fusion zone thereby increases, and the penetration then varies. In contrast, by controlling the heat input in the manner taught by the present invention, the weld seam 7 remains constantly regular and uniform even for that portion extending along the holes such as in the area D.

Figure 3:
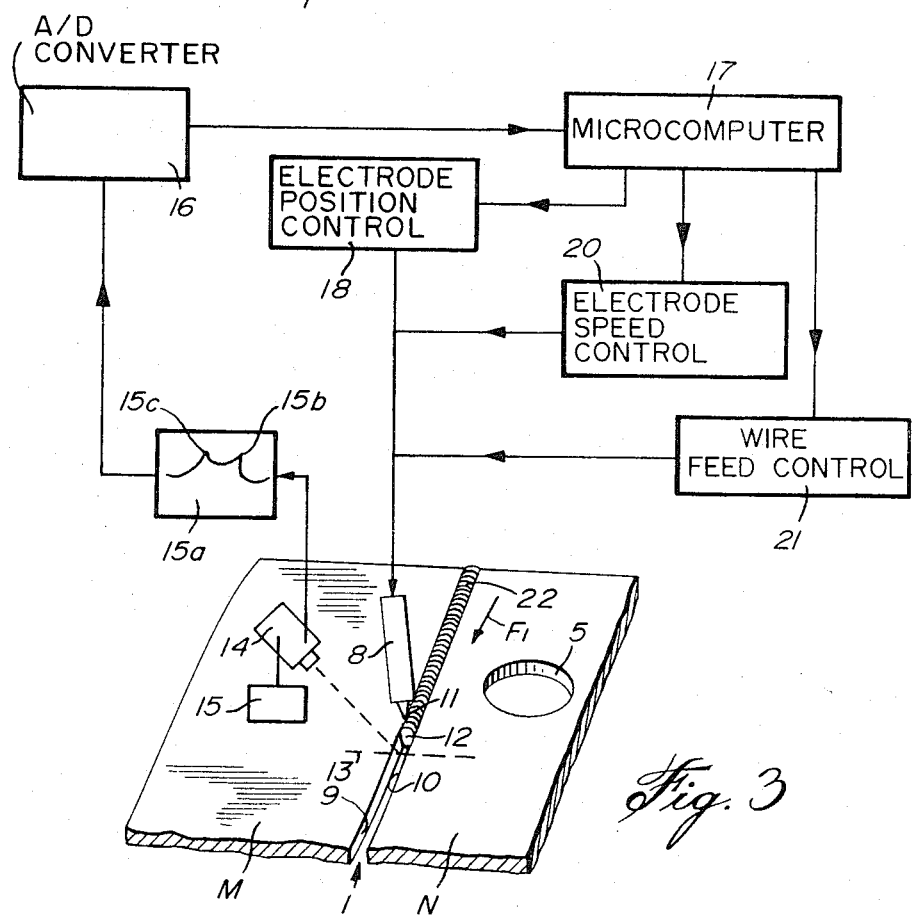
FIG. 3 is a block schematic diagram of a circuit for sensing and processing the signals detected by a thermal radiation energy sensitive device and for controlling predetermined operating characteristics of a welding mechanism.

FIG. 3 shows one embodiment of the adapted control of the welding process in accordance with the present invention. As shown, the electric arc electrode 11 is properly driven along the joint 1 defined between the metal plates M and N, respectively and limited by the edges 9 and 10. The electrode driving mechanism may be any suitable, commercially available mechanism adapted to a standard welding machine. An optical pyrometer 14, which is sensitive to infrared rays emitted from the workpiece heated surface, is mounted in shaped relationship to the electrode holder 8 and is so focused as to mechanically scan the joint 1 by means of a scanning device 15 connected thereto along a line 13 extending across the joint 1 and interiorly of each plate edge mounted at a distance slightly ahead of the molten metal zone 12 produced at the tip of electrode 11. As known in the art, it is noted that the heat generated from the molten weld as well as the arc electrode is propagated as thermal waves through the body of the metal plates and in a radial manner so as to define isothermal lines having progressively lowering values of temperature as the distance from the heating source increases. Therefore, the pyrometer 14 collects infrared rays emanating from the heated plate surfaces to define a temperature profile distribution at a time which reflects the real thermal dissipation condition prevailing ahead of the melt zone 12 in order to adapt the operating characteristics of the electrode 8 to any environmental temperature variations or changes. Adaptation of the electrode characteristics may require a proportional change in the travelling speed of the electrode 8 along the joint 1, or the electrode 8 may be laterally displaced towards edges 9 or 10 in relation to the thermal conditions or additionally the electrode tip may be tilted towards the coolest edge. Moreover, it is to be noted that the amount of infrared rays emitted from edges 9 and 10 is higher than that radiating from the immediately surrounding environment or surface of the plates, according to the well known Poynting effect. As a result, it is possible to obtain from the thermal radiation profile produced by the scanning thermal radiation sensitive device 14 thermal signals having temperature peaks 15b and 15c as seen from box 15a, which precisely corresponds to the accurate position of the edges 9 and 10 immediately ahead of the melt zone 12 and thereby allowing the determination of the gap width between the two metal plates to be welded. In order to produce the highly effective control on the welding operating characteristics of the welding machine, the radiation sensitive device 14 is made to scan along a line transverse to the travelling path of the electrode 11 at a rate higher than the travelling speed of that electrode. Still further, by scanning across the joint and positioning the pyrometer 14 obliquely to the welding surface, it is possible to determine if the workpieces M and N are misaligned vertically because the amplitudes of signal peaks 15b and 15c will be different. Thus, we can control the vertical position of the electrode in accordance with the monitored signals to compensate for vertical misalignment.

In the present example, a hole 5 is shown in the vicinity of the edge of plate N, and the presence of the hole 5 inhibits dissipation of the heat particularly in the space located between the edge 10 and the hole 5. Such heat inhibition causes a rise of temperature at edge 10, which temperature rise produces in turn a substantial overheating along the corresponding portion of the edge 10 and thereby causing a welding machine reaction resulting in variations in the size of the molten material pool as well as the position of the latter and its penetration depth to produce an irregular weld seam. However, with the real time control of the present invention, a general temperature is readily detected by a thermal radiation sensitive device 14 and immediate correcting action takes place by the processing circuitry. Such correcting action may be in the form of an increase in the travelling speed of electrode 11 up to a point where the temperature profile returns to its normal state. Apart from varying the speed of the electrode 11, other corrective action such as the displacement of the electrode over the colder edge or a tilting of the electrode tip toward edge 9, in the present case, may be effected.

In the embodiment shown in FIG. 3, there is also illustrated a circuitry 10,20,21 capable of controlling the position and travelling speed of the electrode as well as to command the welding wire feed rate. The thermal radiation profile detected by the scanning optical pyrometer 14, such profile being shown in box 15a and including two major peaks 15b and 15c, is fed to an analog to digital (A/D) converter 16 connected to a microcomputer 17 which processes the signal into a quantity proportional to the heat input and compares it to a reference value. The result is used to control the electrode speed control circuit 20 as well as the wire feed rate control circuit 21, for controlling individually the various mechanisms (not shown) responsible for establishing the travelling speed of the electrode as well as the feeding rate of the welding wire, respectively. Also, by detecting the peaks 15b and 15c which are present in the thermal radiation profile and correspond to the edges of the joint to be welded, the microcomputer 17 can determine the actual width of the joint in an accurate and reliable manner and use this information to control the electrode position control circuit 18. Consequently, it is noted in addition of providing accurate and reliable determination of the joint or gap width, the control system also allows a continuous command of the electrode position relatively to the joint to be welded while taking into account all changes in the joint width and of the presence of heat dissipation inhibiting elements or even of heat sink elements present along the joint edges in order to form a homogeneous and regular seam 22.

Figure 4:
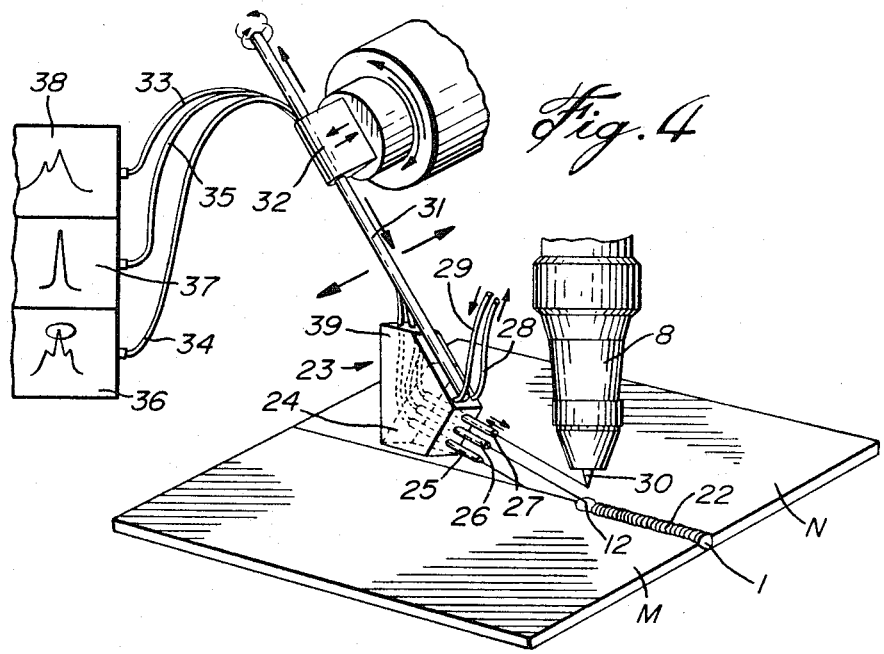
FIG. 4 is a perspective view of a further example of the sensing device in accordance with the present invention.

A further embodiment of the radiation sensitive device is illustrated in FIG. 4. In the instant case, a collimator 23 is located in close proximity herein immediately ahead and along the travelling path of a welding electrode 8 so as to accurately and instantly collect the infrared rays emitted simultaneously from the arc electrode tip 30, the molten weld material 12 forming the regular weld seam 22 and from the heated workpiece joint 1. The collimator 23 is constituted by a bundle of three optic fibers 33, 34 and 35, the respective extremities 25, 26 and 27 of which are housed in a shielded copper housing 39 provided with a cooling compartment through which flows a cooling fluid, such as water, supplied through the intake tube 29 and exhausted through the outtake tube 28. In order to simultaneously detect the infrared rays emitted from the electrode tip, the welding zone and the workpiece joint, respectively, the three optic fibers are superimposed along the vertical plane through the front surface of the housing 39 and these fibers are projecting parallel from the housing surface and fixed at an equal distance from each other.

It is to be noted that each optic fiber tip 25, 26 or 27 is covered with a copper sleeve which, together with the copper housing 39, dependably prevents the detection and the transmission of any stray radiations through the optic fibers. The housing 39 is linked to a mechanical device 32 by means of a shaft 31 which transmits a scanning movement to the collimator 23 either in a direction transverse to the joint path and the electrode path or in rotation. The scanning rate of the collimator 23 is much higher than the travelling speed of the electrode so that a representative thermal radiation profile may be detected by the photo-electric cells 36, 37, 38, respectively connected and receiving the infrared rays transmitted by the optic fibers 34, 35 and 33. It is noted that cooling of the optic fibers housed in housing 39 allows a positioning of the fiber tips as close as possible to the welding zone 12. However, cooling of the optic fibers may become unnecessary if a lens or a set of lenses of a suitable focal length is positioned in front of the fiber tips to allow the positioning of the optic fiber tips away from the high temperature welding zone.

Concerning the various signals transmitted by the optic fibers and detected by the photo-electric cells, the thermal signals collected from the welding zone and detected by cell 36 comprises three peak values, a central peak corresponding to the infrared rays generated by the electrode arc and anodic spot in the weld and two side peaks which are each representative of the welding zone limits. The signal detected by the photo-electric cell 38 is relative to the position of the workpiece joint 1 and includes two peak values defining gap edges wherein the center position between those two peaks precisely defines the center of the joint. Therefore, this arrangement allows to regulate in real time the welding zone width, the position of the latter in connection with the workpiece joint and the joint geometry in function of the thermal radiation profile and also to sense adequately the position of the arc electrode by detecting the high radiation intensity generated by the electrode to the photo-electric cell 37. Although not shown, it would also be possible with the present arrangement to provide an additional optic fiber to be located a at the back of the workpiece to detect the weld penetration depth into a joint. Still further, it is conceived that the optic fiber 35, tip 27 and the cell 37 may be removed from the collimator 23 and instead the position of the arc electrode would be determined by the central peak value of the photo-electric cell 36 representative of the radiation intensity generated by the infrared rays of the electrode arc. Such signals can be interpolated to determine the position of the electrode. All signals detected by the various photo-electric cells 36, 37 and 38 may thereafter be analyzed by microcomputer which will serve to control welding parameters as well the position of the welding electrode, such control being effected in real time for an effective tracking of the joint together with a proper determination of the welding zone width and a proper positioning of the molten material pool in the joint.

Figure 5A:
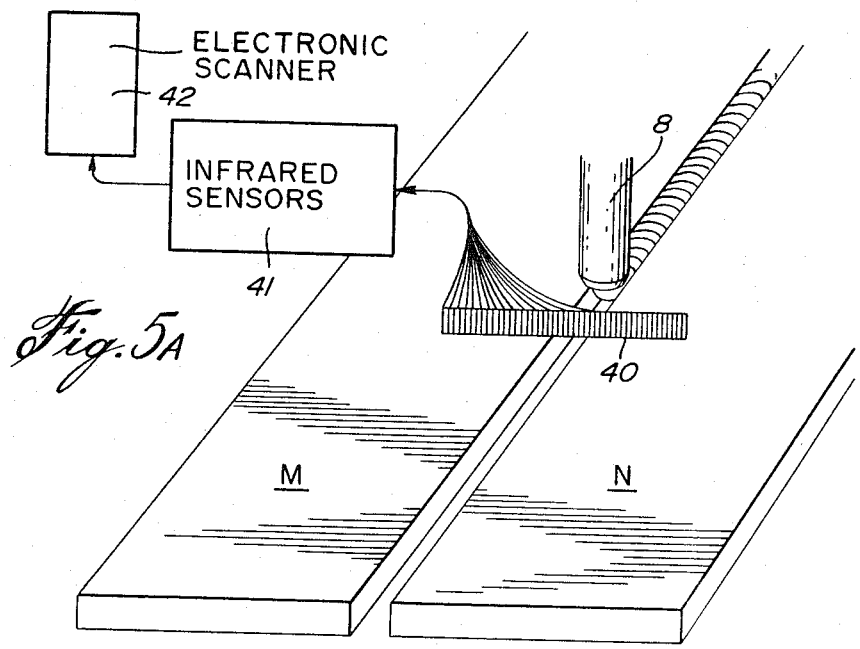
FIG. 5a is a perspective view of another embodiment of the temperature sensing device, the detected values of which are shown in FIG. 5b.
Figure 5B:
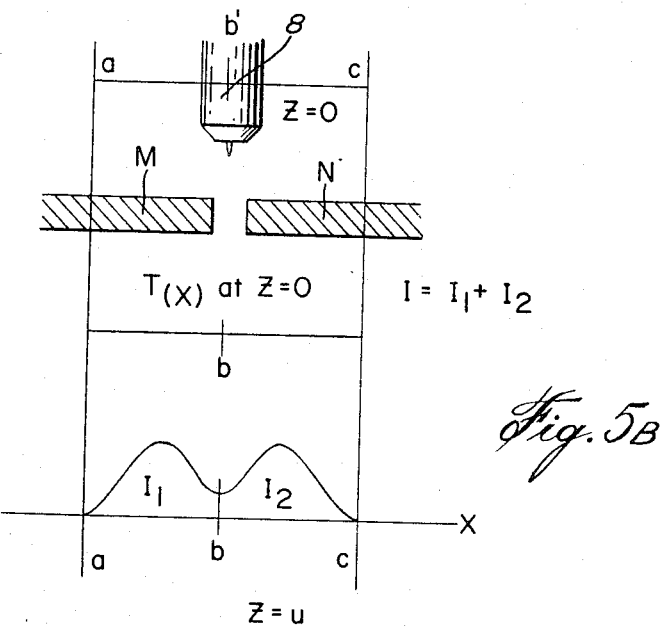

In FIG. 5a, there is shown a further embodiment of the temperature sensing device for collecting the infrared rays emanating from the welding zone in order to electronically scan the workpiece gap in the vicinity of the welding element so as to collect an accurate temperature distribution profile. In contrast with the arrangement shown in FIG. 4, wherein scanning is wholly mechanically performed, here scanning is effected by means of an electronic scanning circuit 42. The cirtuit 42 collects the various temperature data conveyed by an array 40 of a plurality of linearly positioned optic fibers along a scanning line transverse to the longitudinal axis of the weld seam. The array 40 is fixedly mounted ahead of the welding element 8. The data collected by the array 40 are fed into an infrared ray detector 41 for determining, in real time, the actual temperature profile which is in accordance with the distribution function T(X) as shown in FIG. 5b. By integrating the T(X) function it becomes possible to determine accurately the area of relevant portions thereof and thereby to position precisely the welding element above the joint to be welded while probably taking into account any changes in the heat dissipation rate of each workpiece plate. Thus, to maintain a constant thermal flow in the vicinity of the molten material pool, the following integral is calculated:

$$I = \int_a^c T(X)\, dx, \text{ where } I \text{ is the area of function } T(X)$$

and a control signal is applied onto the welding current so as to maintain the above integral constant.

$$I = \int_a^c T(X)\, dx = I \text{ reference.}$$

Since the heating of the plates causes an increase of I and a change in the thermal flow near the welding zone, the input heat provided into the weld has to be regulated. By measuring in real time the value of I and by properly controlling the welding current for providing a constant I, there is then provided a constant thermal flow along the whole weld seam.

On the other hand, by comparing the area values of $I_1$ and $I_2$ which are:

$$I_1 = \int_a^b T(X)\, dx$$

$$I_2 = \int_b^c T(X)\, dx$$

where b corresponds to the minimum point of the T(X) function, it allows detecting any asymmetry in the heat dissipation rate through each plate so as to cause a corrective action onto the welding element mechanism in order to displace same laterally or tilted same for restoring symmetry in the thermal flow.

Figure 6:
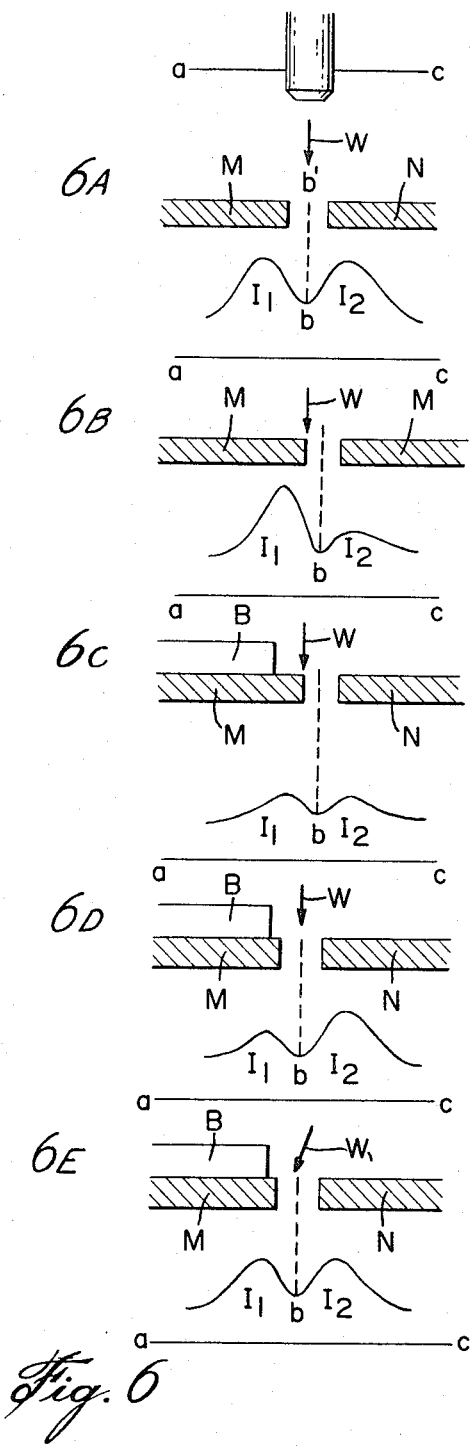
FIGS. 6A–6E schematically illustrate the method of positioning the welding electrode while taking into account the heat dissipation factors of a workpiece.
Figure 7:
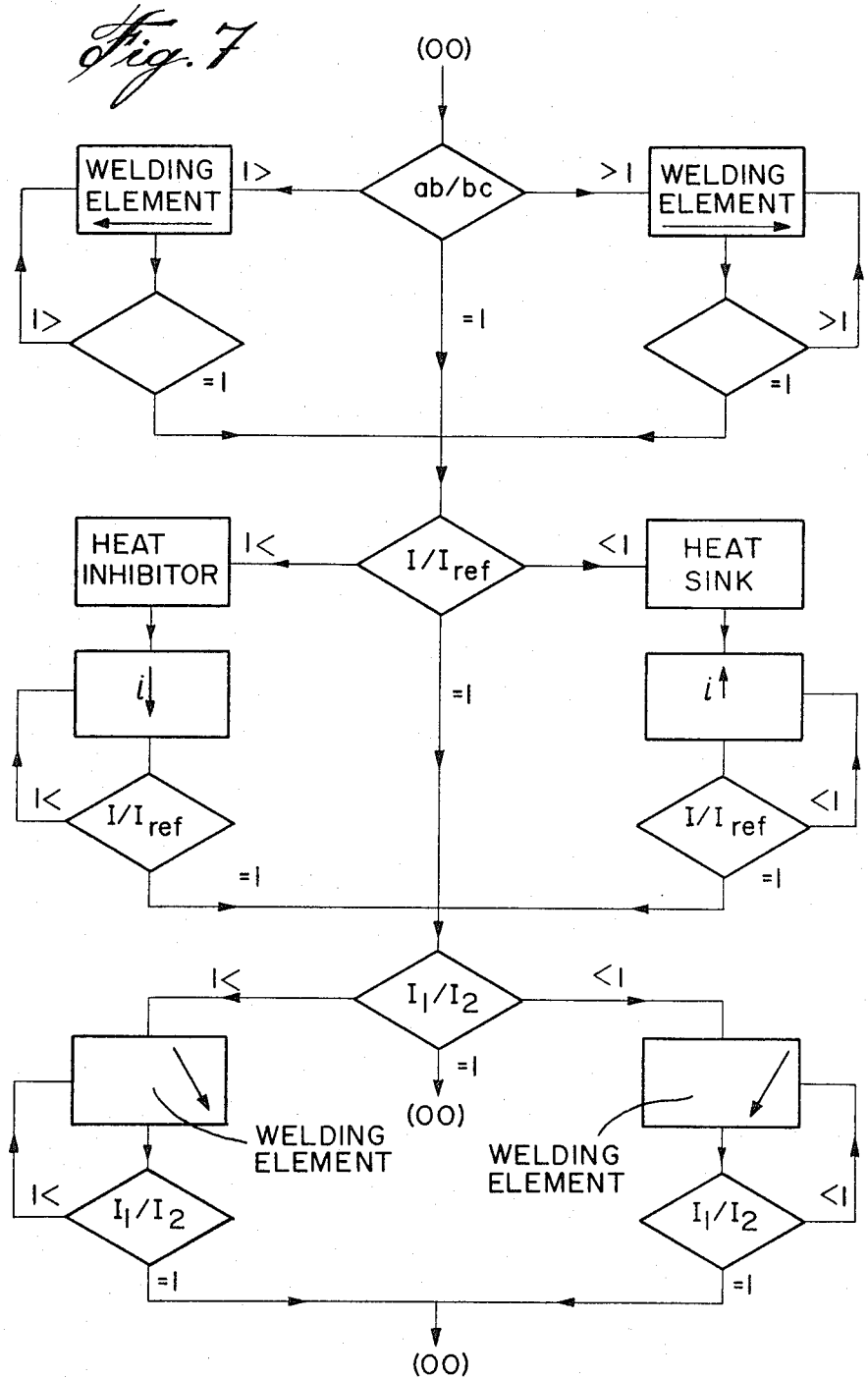
FIG. 7 is a flow chart schematically describing the corrective actions to be taken to counterpart the various situations illustrated in FIG. 6.

Referring to FIG. 6, there is shown several cases designated from 6A to 6E where repositioning of the welding element is achieved in accordance with the general principle explained above. Reference is also made to FIG. 7 where there is schematically illustrated the flow chart giving the various control signals to encounter each of the situations depicted in FIG. 6. In case 6A, there is shown the general shape of the T(X) function when the welding element is properly centered, where no asymmetrical heat dissipation occurs and that the welding operation conditions are optimal. In this case, the minimum value of T(X) is at mid-point and thus ab=bc, I=I ref and $I_1=I_2$; no control signal is then applied to the welding element mechanism. As seen from FIG. 7, any deviation or change in the operating conditions of case 6A will call for corrective actions by way of control signals either onto the welding current, the lateral displacement of the welding element or its tilting by means of proper mechanical means.

Whenever the welding element W is out of center, towards the left, in the example of case 6B, the minimum point of the T(X) function will also be out of center causing ab to be larger than bc. Then a control signal will be provided to displace the welding element towards the right hand, as seen from FIG. 7. Additionally, if the plates become overheated, then I is larger than I ref so that a control signal will be applied on the welding current to make I=I ref again.

In cases 6C, 6D and 6E, there are shown generally examples of situations where the welding element is out of center and a heat sink is in contact with plate M to cause an increase in the heat dissipation rate at the left hand side. The minimum value of T(X) is then out of center, I is lower than I ref and in most cases $I_1$ is different from $I_2$, although it is also possible that $I_1=I_2$ when such lateral displacement of the welding element actually compensates the heat sink effect (case 6C). However, as seen from FIG. 7, the very first action to be taken on the welding element resides in taking it back to center whereby ab=bc. The welding element being centered and the heat sink still located at left, we then have $I_1$ lower than $I_2$ and I lower than I ref as shown in 6D. A command signal will then be issued to control the welding current so as to make I=I ref and the welding element mechanism will be tilted to the left to obtain the relation $I_1=I_2$ as shown in 6A as well as in the flow chart of FIG. 7.

Summing up, the flow chart of FIG. 7 shows the various action under order of occurrence to be applied on the welding element mechanism so as to obtain a desirable weld seam. The first action is to position the welding element at the center of the gap, then the welding current is adjusted for maintaining a constant heat dissipation rate, and finally the welding element is so oriented as to take into account any asymmetrical heat flow.

From there, a proper correlation between I ref and the travelling speed of the welding element is wholly sufficient to ensure a safe cooling rate of the solidifying weld past the welding electrode in order to obtain a good quality weld seam.

Figure 8A:
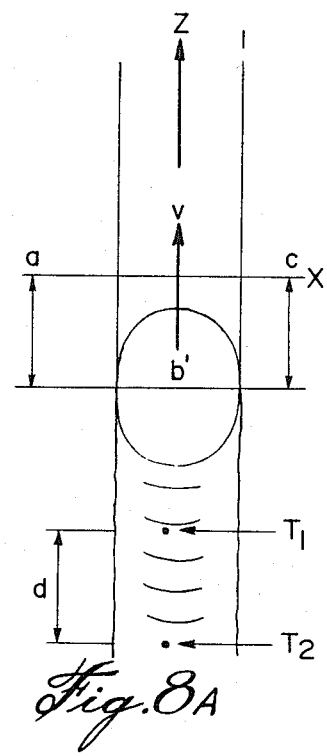
FIG. 8a illustrates a method to determine the cooling rate of the weld seam whereas FIGS. 8b and 8c schematically illustrate the relation between the variation in the cooling rate and the actual travelling speed of the welding element.
Figure 9:
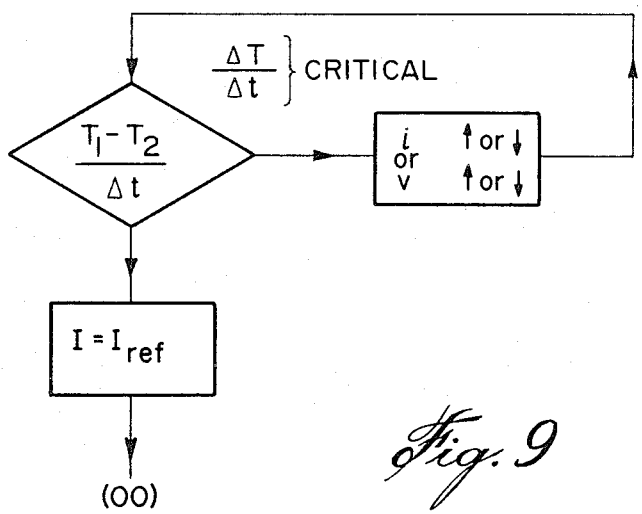
FIG. 9 is an additional flow chart that may be added to the flow chart of FIG. 7 in order to take into account the cooling rate of the weld seam.

FIG. 8a schematically shows how I ref may be determined from a real time measure of two temperatures T1 and T2 taken past the welding element whereas FIG. 9 illustrates an additional flow chart to show how the measured values may be integrated into the flow chart of FIG. 7. The arrangement of FIG. 8a allows the proper determination of the solidification rate of the weld seam, which rate is expressed by $$\frac{T1 - T2}{d/v},$$

where T1 is the temperature determined at the first point, T2 is the temperature taken at the second point, d is the distance between the two temperature points and v is the travelling speed of the welding element. By properly selecting d, it is possible to determine dT/dt within the critical zone and by varying the speed v assurance may be obtained that the actual solidification rate do not exceed the critical rate of the metal, above which cracks may appear in the resulting weld seam.

Figure 8B:
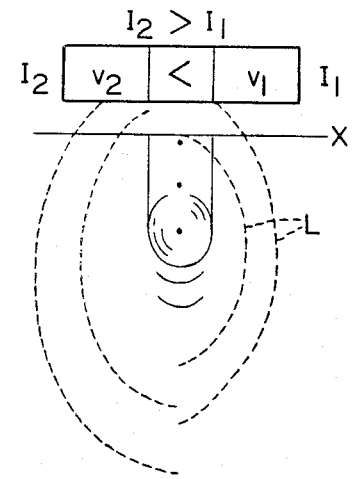
Figure 8C:
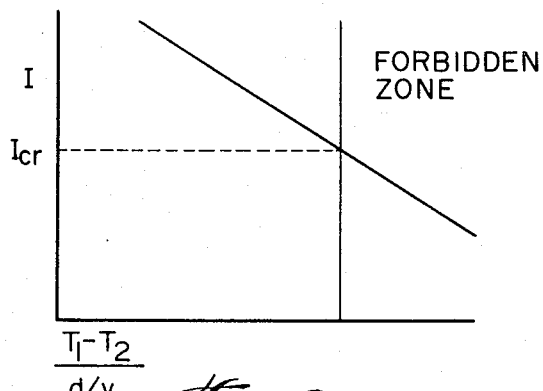

FIGS. 8b and 8c clearly show that there is a true correlation between dT/dt and I since the isothermal lines L get closer and closer as speed v increases. Thus, at low speed, I is relatively large whereas dT/dt is then low. The opposite situation occurs at high speeds. Therefore, by maintaining I larger than I critical, there is some assurance that the cooling rate of the seam remains within safe limits.

FIG. 9 shows a flow chart to be added to the one of FIG. 3 so as to ensure an adequate quality weld by defining a safe I ref.

We claim:

1. A real time control system for controlling predetermined operating characteristics of a welding mechanism movable along a workpiece joint to be welded, said workpiece joint having two opposed edges, said system comprising:
   thermal radiation sensing means responsive to thermal radiation energy emanating from a heated workpiece joint, said sensing means being positioned along a travelling path of a welding element of said welding mechanism, ahead of and in close proximity to said welding element, said sensing means and welding element being disposed on a common side relative to said workpiece joint;
   means for causing said thermal radiation sensing means to scan said workpiece joint along a line transverse to said travelling path so as to allow said sensing means to sense a thermal radiation profile along said transverse scanning line and to provide peak signals representative of the relative position of the edges of said workpiece joint in accordance with the thermal radiation profile sensed, thereby defining the actual width of said joint; and
   circuitry means for processing said peak signals provided by said radiation sensing means to issue command signals for controlling said predetermined operating characteristics of said welding mechanism.

2. A system as claimed in claim 1, wherein said thermal radiation sensing means comprises an optical means responsive to infrared rays emanating from the heated workpiece joint and from said welding element of said welding mechanism.

3. A system as claimed in claim 2, wherein said optical means comprises an optical pyrometer provided with photo-electric cells responsive to said infrared rays for delivering said peak signals.

4. A system as claimed in claim 2, wherein said optical means is fixedly mounted at an angle onto said welding mechanism movable along a path parallel to the travelling path of said welding element.

5. A system as claimed in claim 1, wherein said circuitry means comprises means for processing said peak signals through a microcomputer programmed to adjust the operating characteristics of said welding mechanism.

6. A system as claimed in claim 1, wherein said thermal radiation sensing means comprises a collimator for collecting infrared rays emanating from the heated workpiece joint, the welding element and a molten weld material at a welding zone, said collimator being connected to photo-electric cells responsive to said infrared rays and provided at a location remote from said welding zone.

7. A system as claimed in claim 6, wherein said collimator comprises a bundle of optical fibers operatively set along said workpiece joint and in relation to said welding element to transmit said infrared rays to said photo-electric cells.

8. A system as claimed in claim 7, wherein said bundle of optical fibers has a portion of their length thereof shielded by means of a metal housing to avoid conveyance of stray infrared rays through the fibers.

9. A system as claimed in claim 8, wherein said metal housing incorporates a compartment through which a cooling fluid flows for cooling said portion of lengths of said bundle of optical fibers.

10. A system as claimed in claims 6, 7 or 8, wherein optical lens means are inserted between said collimator and said workpiece joint.

11. A system as claimed in claim 8, wherein a mechanical device is connected to said shielding housing by means of a shaft to displace said housing and said optical fibers to scan said workpiece joint.

12. A system as claimed in claim 1, wherein said thermal radiation sensitive means comprises an array of a plurality of optic fibers.

13. A system as claimed in claim 1, 6 or 12, further including means for determining solidification rate or a resulting weld seam.

14. A real time control system for controlling predetermined operating characteristics of a welding mechanism movable along a workpiece joint to be welded, said workpiece joint having two opposed edges, said system comprising:
- an optical device sensitive to thermal radiation energy emanating from a heated workpiece joint and including photo-electric cells responsive to said radiation energy, said optical device being positioned along a travelling path of a welding element of said welding mechanism, ahead of and in close proximity to said welding element, said optical device and welding element being disposed on a common side relative to said workpiece joint;
- means for causing said optical device to scan said workpiece joint along a line transverse to said travelling path so as to allow said optical device to sense a thermal radiation profile along said transverse scanning line and cause said photo-electric cells to deliver peak signals representative of the relative position of the edges of said workpiece joint in accordance with the thermal radiation profile sensed, thereby defining the actual width of said joint; and
- circuitry means for processing said peak signals delivered by said photo-electric cells of the optical device to issue command signals for controlling said predetermined operating characteristics of said welding mechanism.

15. A system as claimed in claim 14, wherein said optical device comprises an optical pyrometer.

16. A system as claimed in claim 15, wherein said circuitry means includes an analog signal processing circuit receiving said signals emitted from the photo-electric cells, said circuit being connected to a microcomputer programmed to control at least one operating characteristic of the welding mechanism in accordance with preset operation values fed to said microcomputer.

17. A real time control system for controlling predetermined operating characteristics of a welding mechanism movable along a workpiece joint to be welded, said workpiece joint having opposed edges, said system comprising:
- a collimator for collecting thermal radiation energy emanating from a heated workpiece joint, said collimator being connected to photo-electric cells responsive to said radiation energy and being positioned along a travelling path of a welding element of said welding mechanism, ahead of and in close proximity to said welding element, said collimator and welding element being disposed on a common side relative to said workpiece joint;
- means for causing said collimator to scan said workpiece joint along a line transverse to said travelling path so as to allow said collimator to collect said thermal radiation energy along said transverse scanning line and to transmit same to said photo-electric cells, whereby to enable said photo-electric cells to sense a thermal radiation profile along said transverse scanning line and to deliver peak signals representative of the relative position of the edges of said workpiece joint in accordance with the thermal radiation profile sensed, thereby defining the actual width of said joint; and
- means for processing said peak signals delivered by said photo-electric cells to issue command signals for controlling said predetermined operating characteristics of said welding mechanism.

18. A system as claimed in claim 17, wherein said collimator is adapted to collect infared rays emanating from said heated workpiece joint and said welding element and comprises at least two optical fibers for individually conveying said infrared rays to respective photo-electric cells so as to determine the relative position of the welding element and the workpiece joint.

19. A system as claimed in claim 18, wherein said collimator is adapted to collect further infrared rays emanating from a molten weld material and comprises a third optical fiber for conveying said further infrared rays to a respective photoelectric cell so as to determine the width of said molten weld material.

20. A system as claimed in claim 19, wherein a length portion of said optical fibers are shielded by means of a metal housing to avoid conveyance of stray infrared rays through the fibers.

21. A system as claimed in claim 17, 18 or 20, wherein optical lens means are provided between said collimator and said workpiece joint.

22. A system as claimed in claim 20, wherein said metal housing includes a compartment through which flows a cooling fluid for suitably cooling said length portion of the optical fibers.

23. A system as claimed in claim 17, wherein said scanning means comprises mechanical means.

24. A system as claimed in claim 17, wherein said scanning means comprises electronic means.

25. A system as claimed in claim 17, wherein said collimator comprises an array of a plurality of optical fibers.

26. A system as claimed in claim 17, wherein said signal processing means comprises a microcomputer for analyzing said peak signals delivered by the photo-electric cells in order to control the operating characteristics of said welding mechanism.

27. A process for controlling in real time predetermined operating characteristics of a welding mechanism movable along a workpiece joint to be welded, said workpiece joint having opposed edges, said process comprising the steps of:
- (a) positioning a thermal radiation energy sensing means along a travelling path of a welding element of said welding mechanism, ahead of and in close proximity to said welding element, said thermal radiation sensing means being responsive to thermal radiation energy emanating from a heated workpiece joint, said sensing means and welding element being disposed on a common side relative to said workpiece joint;
- (b) causing said thermal radiation sensing means to scan said workpiece joint along a line transverse to said travelling path so as to sense a thermal radiation profile along said transverse scanning line and to provide peak signals representative of the relative position of the edges of said workpiece joint in accordance with the thermal radiation profile sensed, thereby defining the actual width of said joint; and
- (c) processing said peak signals through circuitry means to issue command signals for controlling said predetermined operating characteristics of said welding mechanism.

28. A process as claimed in claim 27, wherein step (c) comprises processing said peak signals into a quantity proportional to heat input and comparing said quantity to a reference value so as to modify the travelling speed of said welding element whenever said quantity varies.

29. A process as claimed in claim 27, wherein the thermal radiation energies emanating from said welding element, from said heated workpiece joint and from a molten weld material are sensed simultaneously so as to determine the relative position of said welding element and said workpiece joint as well as the width of said molten weld material.

30. A process as claimed in claim 29, wherein said thermal radiation sensing means comprises a collimator for collecting infrared rays emanating from said welding element, said heated workpiece joint and said molten weld material, said collimator being connected to photoelectric cells responsive to said infrared rays and being shielded against stray infrared rays, a cooling fluid flowing through a shielded housing of said collimator.

31. A process as claimed in claim 30, wherein step (b) includes rotationally displacing said collimator.

32. A process as claimed in claim 27, wherein said peak signals include two major peaks each defining a temperature distribution area and wherein step (c) comprises controlling the position of the welding element of said welding mechanism by laterally displacing said welding element between the edges of said joint to occupy a position corresponding to a central location between said two peaks or by angularly orienting said welding element so as to equalize the temperature distribution areas of said peaks.

33. A process as claimed in claim 27, further including the step of determining the solidification rate of the resulting weld seam past said welding mechanism.

34. A process as claimed in claim 33, wherein said determining step includes the step of detecting individually the temperatures of two points located along the longitudinal axis of said weld seam and at a predetermined distance from one another.

* * * * *